United States Patent
Buwalda et al.

(10) Patent No.: US 6,890,579 B2
(45) Date of Patent: May 10, 2005

(54) REVERSIBLE GEL FORMATION

(75) Inventors: Pieter Lykle Buwalda, Groningen (NL); Heine Roelf Meima, Borgercompanie (NL); Jakob Roelf Woltjes, Veendam (NL)

(73) Assignee: Cooperatieve Verkoop-En Productievereniging Van Aardappelmeel en Derivaten Avebe B.A., Ja Veendam (NL)

( * ) Notice: Subject to any disclaimer, the term of this patent is extended or adjusted under 35 U.S.C. 154(b) by 0 days.

(21) Appl. No.: 10/240,150

(22) PCT Filed: Apr. 12, 2001

(86) PCT No.: PCT/NL01/00295

§ 371 (c)(1),
(2), (4) Date: Apr. 16, 2003

(87) PCT Pub. No.: WO01/78526

PCT Pub. Date: Oct. 25, 2001

(65) Prior Publication Data

US 2003/0157232 A1 Aug. 21, 2003

(30) Foreign Application Priority Data

Apr. 14, 2000 (EP) .......................... 00201364

(51) Int. Cl.$^7$ ..................... A23L 1/0522; A23L 1/0528
(52) U.S. Cl. ..................... 426/578; 426/579; 426/508
(58) Field of Search ................. 426/578, 579, 426/508

(56) References Cited

U.S. PATENT DOCUMENTS 4,971,723 A * 11/1990 Chiu .......................... 516/105
2003/0124724 A1 * 7/2003 Visser et al. ................ 435/421
2003/0145763 A1 * 8/2003 Grull et al. .............. 106/206.1

FOREIGN PATENT DOCUMENTS

| EP | 0 372 184 A1 | 6/1990 |
| EP | 0 799 837 A2 | 10/1997 |
| EP | 0 824 161 A2 | 2/1998 |
| WO | WO 00/06607 | 2/2000 |
| WO | WO 00/42076 | 7/2000 |

* cited by examiner

*Primary Examiner*—N. Bhat
(74) *Attorney, Agent, or Firm*—Hoffmann & Baron, LLP

(57) ABSTRACT

The invention relates to a gelling agent for production of a reversible gel. The gelling agent is a degraded root or tuber starch comprising at least 95 wt. % of amylopectin, based on dry substance of the starch. The gelling agent according to the invention is particularly suitable for use in food products.

16 Claims, No Drawings

REVERSIBLE GEL FORMATION

This application is the U.S. National Phase of International Application Number PCT/NL01/00295 filed on Apr. 12, 2001, which is incorporated herein by reference.

BACKGROUND OF THE INVENTION

The invention relates to gelling agents for use in the food industry and to reversible gels obtainable by use of said gelling agents.

In the food industry gelling agents are widely applied. Virtually every non-dry food formulation is in some way or another a gel. Gelling agents can be divided into two main categories: agents that form gels resistant and substantially stable to heating under conditions applied for or during the end use (irreversible gels) and agents that form gels that can be molten during process or end use (reversible gels). Reversible gels are thus unstable under the conditions wherein the end product, in which they are applied, are used.

Examples of the first category of gelling agents are calcinated alginates, low methoxyl pectins and degraded starches. Examples of the second category are: gelatin, carrageenans, high methoxyl pectins and caseinates. The reversible gels may go through several cycles of gelling and melting, allowing for rework of redundant materials or slicing of foods that will be liquefied during cooking, etc.

A drawback of the second category of gelling agents is their high price and sometimes lack of availability. Furthermore some gelling agents have been connected with adverse health effects.

Gelatin (or hydrolyzed collagen) is derived from animal sources such as cattle. Recently 35 young Brittons and one Frenchman died of a new variant of the Creutzfeld-Jakob disease. This prion related disease has been connected to BSE or mad cow disease. Although most governments in Western society have taken strict measurements, public concerns related to the consumption of proteins such as gelatin derived from cattle are still present. A further drawback of gelatin and in some cases casein is that they are not in compliance with certain religious diet regulations. Carrageenans are known to promote certain types of colon cancer (Arakaw, Ito and Tejima; Journal of Nutritional Science and Vitaminology 34, 577–585, 1988).

Consequently, among the general public lives a growing desire to consume products not derived from gelatin or carrageenans. Furthermore there is a strong incentive to move away from expensive gelling agents such as gelatin, carrageenans and casein.

It is an object of the invention to provide a substitute for gelling agents for the formation of reversible gels. It is particularly an object of the invention to provide a substitute for gelling agents such as gelatin, carrageenans and casein. It is furthermore an object of the invention to provide a substitute for said gelling agents, which has sufficiently similar gelling and melting properties as said gelling agents. Other objects of the invention will become clear from the following description and examples.

SUMMARY OF THE INVENTION

In accordance with the invention, the above objects are reached by application of a specific degraded starch as gelling agent. Accordingly, the invention relates to a reversible gelling agent in the form of a degraded root or tuber starch, which starch comprises at least 95 wt. % of amylopectin, based on dry substance of the starch.

The application of hydrolyzed amylopectin corn (waxy corn or waxy maize) starch as a substitute for casein in meltable imitation cheese has been described in EP 0 363 741. For the hydrolysis a debranching enzyme is applied. Regular acid hydrolysis is not applicable. The enzymatic conversion, however, has to be carried out in rather dilute solution leading to tedious work-up procedures and extra costs.

In the present invention a method is presented in which starch can be degraded in the granular form resulting in products that form reversible gels in applications, e.g. in the food industry. Granular degradation has an advantage over degradation in solution because side products can be removed with ease and drying is no problem resulting in a substantial decrease in cost price.

DETAILED DESCRIPTION OF THE INVENTION

Most starches typically consist of granules in which two types of glucose polymers are present. These are amylose (15–35 wt. % on dry substance) and amylopectin (65–85 wt. % an dry substance). Amylose consists of unbranched or slightly branched molecules having an average degree of polymerization of 100 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose. Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% of amylopectin. The amylose content of these cereal starch, granules is therefore less than 5%, and usually less than 2%. The above cereal varieties ate also referred to as waxy cereal grains, and the amylopectin starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain, about 20% amylose and 80 % amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising substantially only amylopectin.

In the formation of starch granules, different enzymes are catalytically active. Of these enzymes, the granule bound starch synthase (GBSS) is involved in the formation of amylose. The presence of the GBSS enzyme depends an the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter alia, J. H. M. Hovenkamp-Hermelink et al., "Isolation of amylose-free starch mutant of the potato (*Solanum. tuberosum* L.)", Theor. Appl. Gent., (1987), 75:217–221"

and E. Jacobsen et. al., "Introduction of an amylose-free (amf), mutant—into breeding of cultivated potato, *Solanum tuberosum* L., Euphytica, (1991): 53:247–253.

Elimination or inhibition of the expression of the GBSS gene in the potato is also possible by using so-called antisense inhibition. This genetic modification of the potato is described in R. G. F. Visser et al., "Inhibition of the expression of the gene for granule-bound starch synthase in potato by antisense constructs", Mol. Gen. Genet., (1991), 225:289–296.

By using genetic modification, it has been found possible to cultivate and breed roots and tubers, for instance potato, yam, or cassava (Patent South Africa 97/4383), of which the starch granules contain little or no amylose. As referred to herein, amylopectin starch is the starch granules isolated from their natural source and having an amylopectin content of at least 95 wt. %, preferably at least 98 wt. %, based on dry substance.

Regarding production possibilities and properties, there are significant differences between amylopectin potato starch on the one hand, and the waxy cereal starches on the other hand. This particularly applies to waxy maize starch, which is commercially by far the most important waxy cereal starch. The cultivation of waxy maize, suitable for the production of waxy maize starch is not commercially feasible in countries having a cold or temperate climate, such as The Netherlands, Belgium, England, Germany, Poland, Sweden and Denmark. The climate in these countries, however, is suitable for the cultivation of potatoes. Tapioca starch, obtained from cassava, may be produced in countries having a warm and moist climate, such as is found in regions of South East Asia and South America.

The composition and properties of root and tuber starch, such as amylopectin potato starch and amylopectin tapioca starch, differs from those of the waxy cereal starches. Amylopectin potato starch has a much lower content of lipids and proteins than the waxy cereal starches. Problems regarding off taste an odor and foaming, which, because of the lipids and/or proteins, may occur when using waxy cereal starch products (native and modified), do not occur, or occur to a much lesser degree when using corresponding amylopectin potato or tapioca starch products. In contrast to the waxy cereal starches, amylopectin potato starch contains chemically bound phosphate groups. As a result, amylopectin potato starch products in a dissolved state have a distinct poly-electrolyte character.

Yet another important difference between amylopectin starches from potato and tapioca and waxy maize starch is the average chain length of the highly branched amylopectin molecules. Waxy maize starch has an average chain length of about 23 anhydroglucose units, amylopectin tapioca and potato starch of 28 and 29 anhydroglucose units respectively.

As mentioned before the invention relates to the application of starch that is degraded in the granular form. During a process of chemical or enzymatic degradation in the granule the linkages in starch are disconnected, thereby reducing the molecular weight and shortening the chains. In the granule form, the α-D-(1–6) linkages are more readily degraded than the α-D-(1–4) linkages. This is believed to be due to the constitution of the granule (O. B. Wurzburg, Modified starches: properties and uses, CRC Press, Boca Raton 1986, page 19). Nevertheless the degradation of both linkages is observed. Thus, the degradation of amylopectin starch results in the formation of short chain amylose together with degraded amylopectin.

The gelling of starch solutions is driven by crystallization. The temperature of dissolution of these gels is governed by the melting temperature of the crystals formed. The melting temperature of the crystals depends on the chain length of amylopectin and the amylose of which the crystals are composed of (M. T. Kalichevski, S. G. Ring; Carbohydrate Research 49–55, 198, 1990). This explains why debranching of waxy maize leads to reversible gels and acid hydrolysis or oxidation does not. Acid hydrolysis or oxidation will lead to a shorter average chain length of the linear dextrins in the products and the chains formed are too short for the formation reversible gels. Debranching will yield linear dextrins with a higher molecular weight and therefore the gels will melt at temperatures above room temperature. As potato and tapioca amylopectin have longer average chain lengths than waxy maize, the resulting gels of degradation products, even of acidic hydrolysis or oxidation, do form reversible gels.

Hence, in accordance with the invention, degradation of amylopectin starches can be achieved by a number of methods (in order of preference): acid hydrolysis, enzymatic hydrolysis, oxidation and dextrinization. To the artisan a number of methods are known to perform these degradations in the granular form. Preferably all are carried out in water as a solvent. The pH and temperature during the degradation provide means to ensure that the starch is degraded in its granular form. Optionally, a swelling inhibitor may be added to the reaction mixture, particularly in case of the enzymatic hydrolysis. A suitable swelling inhibitor is for example a salt like sodium sulfate or sodium chloride which may be added in an amount of more than 10 grams per kilogram of starch in the reaction mixture. Preferably, the amount of salt added is small enough to prevent its precipitation.

Acid hydrolysis may be carried out using sulfuric or hydrochloric acid. The acid will be used in excess and to obtain a reaction mixture having a pH below 3. The conditions during the reaction will typically comprise a temperature of 0–65° C., preferably 25–55° C., more preferably 30–50° C.

Enzymatic hydrolysis may be carried out using a hydrolytic enzyme which is capable of degrading starch in its granular form. Examples of such enzymes include debranching enzymes such as pullullanases, iso-amylases (Promozyme®, Optimax®) and maltogenases, and enzymes such as may be obtained from *Bacillus Licheniformis* or *Bacillus Stearothermophilus* (Maxamyl®).

Oxidation may be carried out using a hypochlorite solution at a temperature of 10–45° C., preferably 25–35° C. The pH during oxidation is typically from 5 to 12, preferably from 7 to 11.

Dextrinization may be carried out in any suitable known manner which can conveniently be determined by the person skilled in the art.

The extent to which the starch is degraded, may be expressed in terms of intrinsic viscosity. The intrinsic viscosity is expressed in dl/g and may be determined in any known manner, for instance as described by H. W. Leach in Cereal Chemistry, vol. 40, page 595 (1993) using an Ubbelohde viscometer and a 1M sodium hydroxide solution in water as a solvent. The intrinsic viscosity provides a measure for the molecular weight and thus for the extent of the degradation of the starch. It is preferred that the starch is degraded to yield a product having an intrinsic viscosity of at least 0.1 dl/g, more preferably at least 0.3 dl/g.

The products obtained after degradation may be derivatized using well known techniques such as esterification using alkanoic acid anhydrides, acetic anhydride, adipic anhydride and octenyl succinic anhydride or reactive phosphorus compounds such as sodium trimetaphosphate or phosphorus oxytrichloride. Another well known technique is etherification using alkylhalides or epoxides. Suitable manners of preparing the starch ethers or esters are for instance set forth in O. B. Wurzburg, Modified starches: properties and uses, CRC Press, Boca Raton 1986. Of course it is possible to derivatize the starch prior to, instead of after, degradation resulting in more or less the same products as the reversed route.

The starches resulting from degradation may be applied in a wide range of applications in which the melting characteristics are advantageous. Examples of such applications are imitation cheese, soft confectionery, desserts, savory, sliced foods for microwave applications, soups, gravies, sauces, pizza toppings, liquorice and pie fillings. In these applications degraded amylopectin starch can be used to effect the formation of a meltable gel alone or in a combination with another gel forming agents such as casein gelatin and the like.

The gel will normally be formed in the preparation of the product in which the starch is used. By heating the starch, or a mixture containing the starch, to a temperature above the gelatinization temperature of the starch (about 60° C. for potato starch) and subsequent cooling below said temperature, a gel is formed. In order to reverse the process and to break up the gel-like behavior, the gel is heated again to above the gelatinization temperature. In a matter of speaking, the gel is melted.

The invention will now be elucidated by the following, non-restrictive examples.

EXAMPLE 1

This example shows that gels of degraded amylopectin starch are capable of melting and gels based on regular starch do not melt.

Acid Degradation of Starch

A 39% (w/w) suspension is prepared of 1 kg of amylopectin potato starch in water. 15 mL of 10 N $H_2SO_4$ are added and the temperature is maintained at 45° C. for 24 hours. The reaction suspension is filtered and the starch is suspended in water again. This suspension is then neutralized using 4.4 % (w/w) NaOH solution. The product is obtained by filtering, washing on the filter and drying.

In this way different products can be obtained by varying in starch and the amount of acid.

Melting Behavior of Acid Degraded Potato Starch and Amylopectin Potato Starch

The products are dissolved at the desired concentration at 100° C. during 15 minutes with stirring. Afterwards the solutions were cooled to approx. 70° C. and subsequently stored at 4° C. during 17 hours. Finally the solutions were again heated at the desired temperature for 10 minutes. The solutions were evaluated visually. The temperatures are measured by a thermometer in the gel (internal temperature).

In table 1, the results of degradation using 15 mL 10 N $H_2SO_4$ per kg of starch are summarized and in table 2 the results of the degradation using 20 mL of 10 N $H_2SO_4$. In the tables, Int. Temp. stands for the internal temperature in the gel.

Waxy corn starch was degraded in the same manner and judged on gelling and melting behavior. The degraded waxy corn starch products yielded only very weak gels, which melted below or at room temperature.

TABLE 1

Melt characteristics of gels of starch degraded with 15 mL of $H_2SO_4$ per kg

| | Acid degraded potato starch | | | Acid degraded amylopectin potato starch | | |
|---|---|---|---|---|---|---|
| Bath Temp | Appearance | Color | Int. Temp | Appearance | Color | Int. Temp |
| 40° C. | firm gel | White | | firm gel | White | |
| 45° C. | firm gel | White | | firm gel | white | |
| 50° C. | firm gel | White | | soft gel | less white | |
| 55° C. | firm gel | White | 53° C. | soft gel | less white | 53° C. |
| 60° C. | firm gel | white | 59° C. | no gel | opalescent | 58° C. |
| 65° C. | firm gel | less white | 63° C. | no gel | almost clear | 63° C. |
| 70° C. | firm gel | less white | 68° C. | no gel | clear | 67° C. |
| 75° C. | firm gel | less white | 75° C. | no gel | clear | 72° C. |
| 100° C. | softer gel | opalescent | 93° C. | no gel | clear | n.m. |

TABLE 2

Melting behavior of gels of acid degraded potato starch and amylopectin potato starch (20 mL 10N $H_2SO_4$ per kg)

| | Acid degraded potato starch | | | Acid degraded amylopectin potato starch | | |
|---|---|---|---|---|---|---|
| Bath Temp | Appearance | Color | Int. Temp | Appearance | Color | Int. Temp |
| 40° C. | firm gel | white | 40° C. | softer gel | white | |
| 45° C. | firm gel | white | 45° C. | soft gel | less white | 45° C. |
| 50° C. | firm gel | white | 49° C. | soft gel | less white | 49° C. |
| 55° C. | firm gel | white | 55° C. | very soft gel | opalescent | 54° C. |
| 60° C. | firm gel | white | 59° C. | no gel | almost clear | 59° C. |
| 65° C. | firm gel | white | 64° C. | no gel | clear | 64° C. |
| 70° C. | firm gel | less white | 68° C. | no gel | clear | 68° C. |
| 75° C. | firm gel | less white | 74° C. | no gel | clear | 74° C. |
| 100° C. | softer gel | opalescent | 92° C. | no gel | clear | n.m. |

EXAMPLE 2

This example shows that amylopetin potato starch is capable of forming reversible gels in an application without the addition of other gelling agents Wine gum preparation
The following recipe was used:

| | |
|---|---|
| Sugar | 34.9% |
| Glucose syrup DE42 | 35.2% |
| Acid degraded amylopectin potato starch as obtained in Example 1 | 10.1% |
| Water | 19.8% |
| Color/aroma | |

Method of Preparing

The ingredients are mixed in a preparation tank. The solution is cooked at 130° C., using Ter Braak indirect cooking system. Vacuum is applied to the solution after cooking. The cooked solution is molded into shapes. The product is dried at 50° C. for 24 hours.

Products based on amylopectin potato starch can be molten when stored in a beaker with water of ca. 50° C. (1:1 by weight), while products based on regular potato starch do not melt under these conditions. As alternative products based may be melted employing microwave.

EXAMPLE 3

This example shows that amylopetin potato starch is capable of forming reversible gels in an application with the addition of other gelling agents i e. casein.

Cheese analog preparation (mozzarella-style)

Ingredients:

| | |
|---|---|
| Water | 47.8% |
| Hydrogenated soy oil | 21.7% |
| Sodium caseinate | 18.9% |
| Acid degraded starch | 5.5% |
| Sweet Whey | 1.8% |
| Salt | 1.4% |
| Citric acid | 0.8% |
| Disodium phosphate dihydrate | 0.7% |
| Flavor | 0.5% |
| Sodium citrate | 0.4% |
| Beta Carotene 100 IU | 0.2% |
| Potassium sorbate | 0.1% |
| Lactic acid 88% | 0.1% |

In a 5 gallon cheese cooker at 70–80° C. the sodium phosphate, the sodium citrate, the salt and the potassium sorbate are dissolved in $\frac{2}{3}^{rd}$ of the water. Then the casein is slowly added with mixing for 3–4 minutes. The oil and the carotene are added. Then another $\frac{1}{6}^{th}$ of the water, the whey, the flavor and the citric an lactic acid are added followed by vigorous stirring. The rest of the water and the degraded starch are added followed by mixing for 10 min at 70° C. The product is left at room temperature for 1 hour and refrigerated overnight. The cheese was readily molten at ca. 60° C.

What is claimed is:

1. A gelling agent comprising a degraded root or tuber starch, which starch comprises at least 95 wt. % of amylopectin, based on dry substance weight of starch, wherein said gelling agent is reversible.

2. Reversible gelling agent according to claim 1, wherein the starch comprises at least 98 wt. % of amylopectin, based on dry substance weight of starch.

3. Reversible gelling agent according to claim 1, wherein the starch is potato or tapioca starch.

4. Reversible gelling agent according to claim 1, wherein the starch is degraded by acidic hydrolysis, enzymatic hydrolysis, oxidation, dextrinization or a combination thereof.

5. Reversible gelling agent according to claim 1, wherein the starch is obtained by degradation in granular form.

6. Reversible gelling agent according to claim 1, wherein the starch is etherified or esterified prior to or after degradation.

7. A method for producing a reversible gel comprising forming a reversible gel from a gel containing the reversible gelling agent according to claim 1.

8. Reversible gel comprising a reversible gelling agent according to claim 1.

9. Reversible gel according to claim 8, wherein the gel is substantially free of any gelling agents other than said degraded starch.

10. A method for producing a food product comprising incorporating the reversible gelling agent according to claim 1 into said food product.

11. Food product comprising a reversible gelling agent according to claim 1.

12. Food product according to claim 11 being an imitation cheese, soft confectionery, dessert, savory, sliced food product for microwave application, gravy, sauce, pizza topping, liquorice or pie filling.

13. Process for forming a gel wherein a mixture of a reversible gelling agent according to claim 1 and water is heated to a temperature above the gelatinization temperature of the starch and subsequently cooled to below said temperature.

14. Gel obtainable by a process according to claim 13.

15. Process for breaking up a gel according to claim 14 comprising heating the gel to a temperature above the gelatinization temperature of the starch.

16. Reversible gelling agent according to claim 1 consisting of a degraded root or tuber starch, which starch comprises at least 95 wt. % of amylopectin, based on dry substance weight of starch.

* * * * *

UNITED STATES PATENT AND TRADEMARK OFFICE
CERTIFICATE OF CORRECTION

PATENT NO. : 6,890,579 B2
DATED : May 10, 2005
INVENTOR(S) : Buwalda et al.

It is certified that error appears in the above-identified patent and that said Letters Patent is hereby corrected as shown below:

Column 2,
Line 36, now reads "varieties ate also" should read -- varieties are also --.

Column 6,
Table 2, line 30, now reads:

| Bath Temp | Appear-ance | Color | Int. Temp | Appear-ance | Color | Int. Temp |
|---|---|---|---|---|---|---|
| 40°C. | firm gel | white | 40°C. | softer | white | | should read

| Bath Temp | Appear-ance | Color | Int. Temp | Appear-ance | Color | Int. Temp |
|---|---|---|---|---|---|---|
| 40°C. | firm gel | white | 40°C. | softer | white | 40°C |

Signed and Sealed this

Twenty-second Day of November, 2005

JON W. DUDAS
*Director of the United States Patent and Trademark Office*